(No Model.) 4 Sheets—Sheet 1.
E. G. T. COLLES.
FEED WATER HEATER AND PURIFIER.
No. 523,325. Patented July 24, 1894.
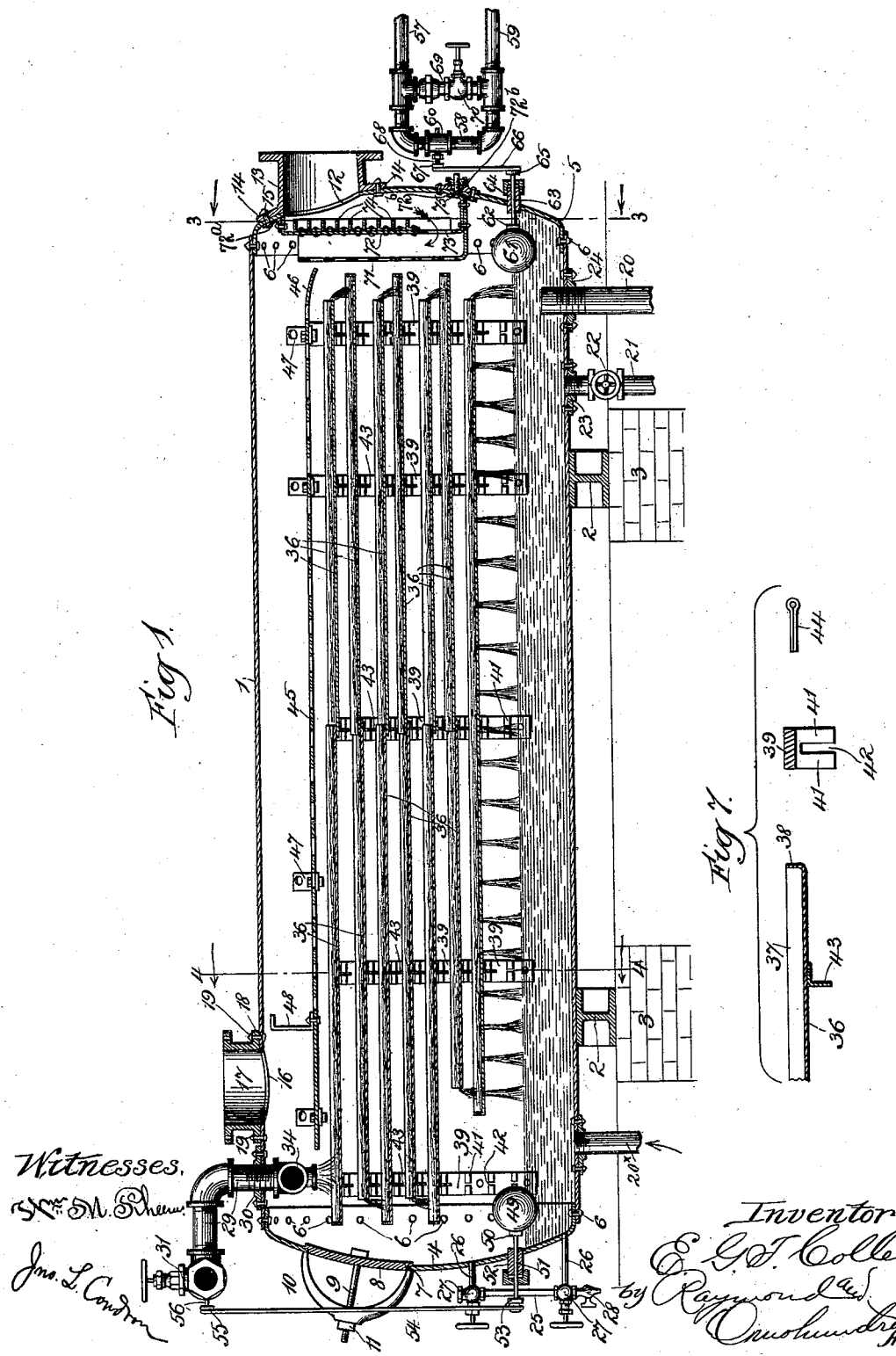

(No Model.) 4 Sheets—Sheet 2.
E. G. T. COLLES.
FEED WATER HEATER AND PURIFIER.
No. 523,325. Patented July 24, 1894.
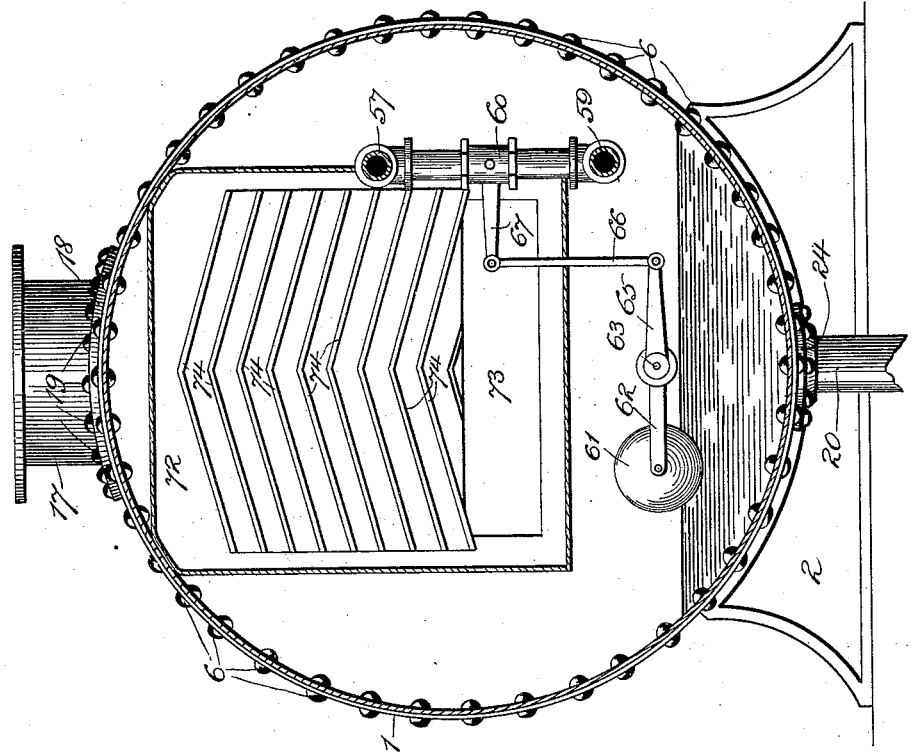
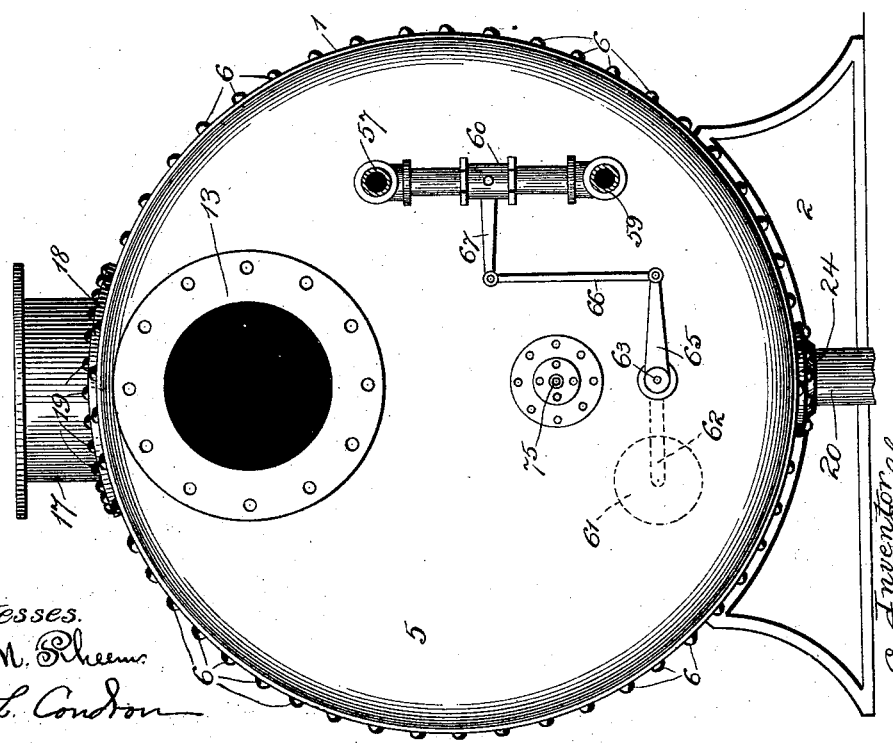
Witnesses.

(No Model.) 4 Sheets—Sheet 3.
E. G. T. COLLES.
FEED WATER HEATER AND PURIFIER.
No. 523,325. Patented July 24, 1894.
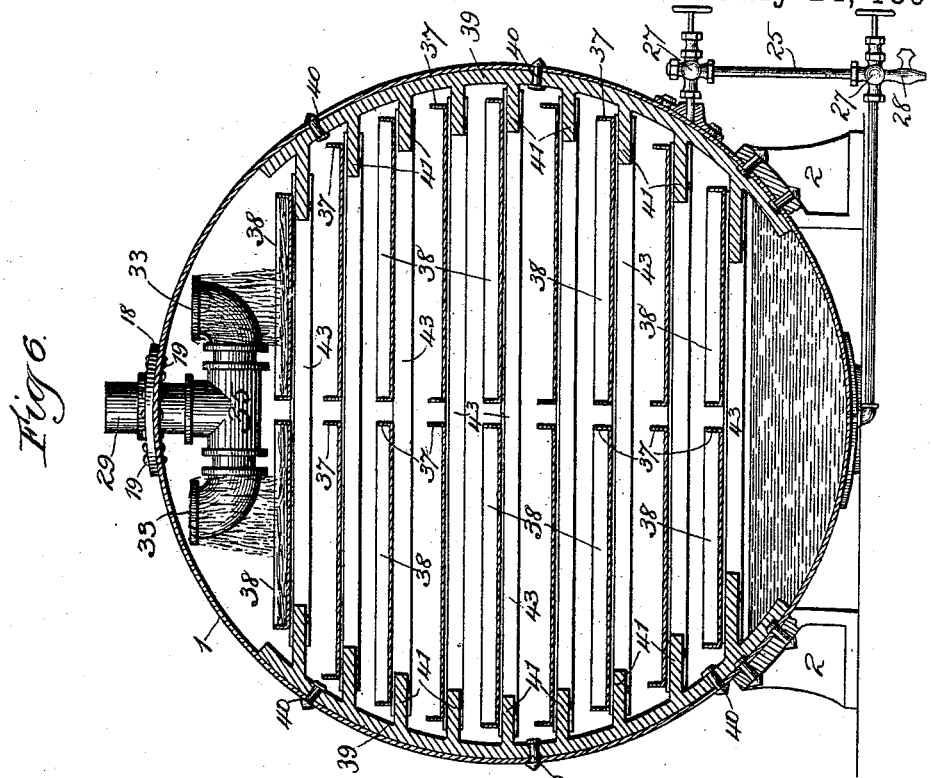
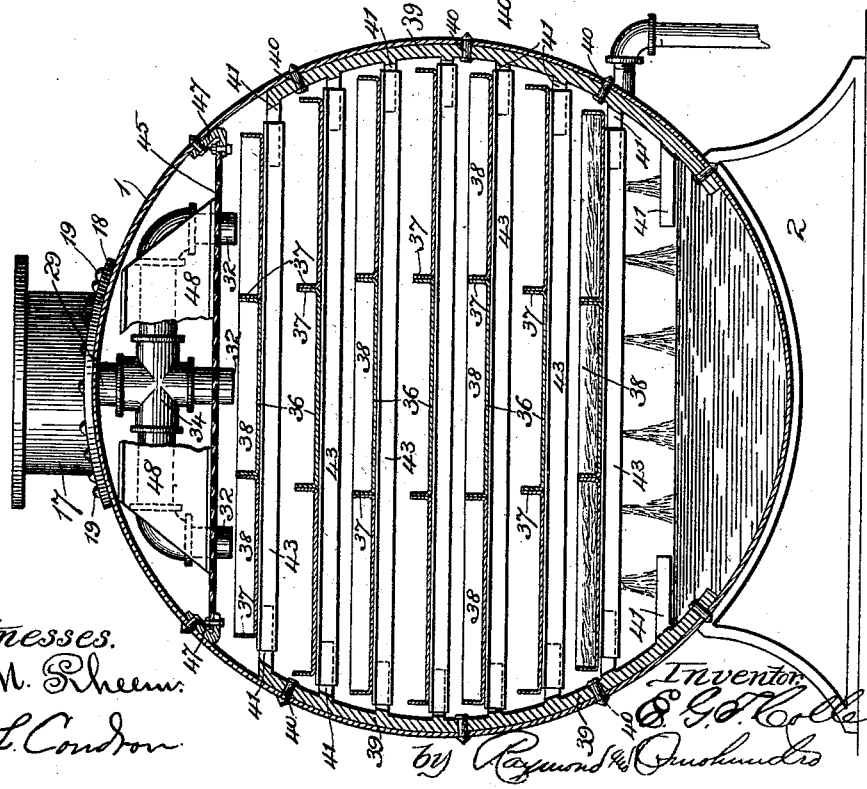

(No Model.)  E. G. T. COLLES.  4 Sheets—Sheet 4.
FEED WATER HEATER AND PURIFIER.
No. 523,325.  Patented July 24, 1894.
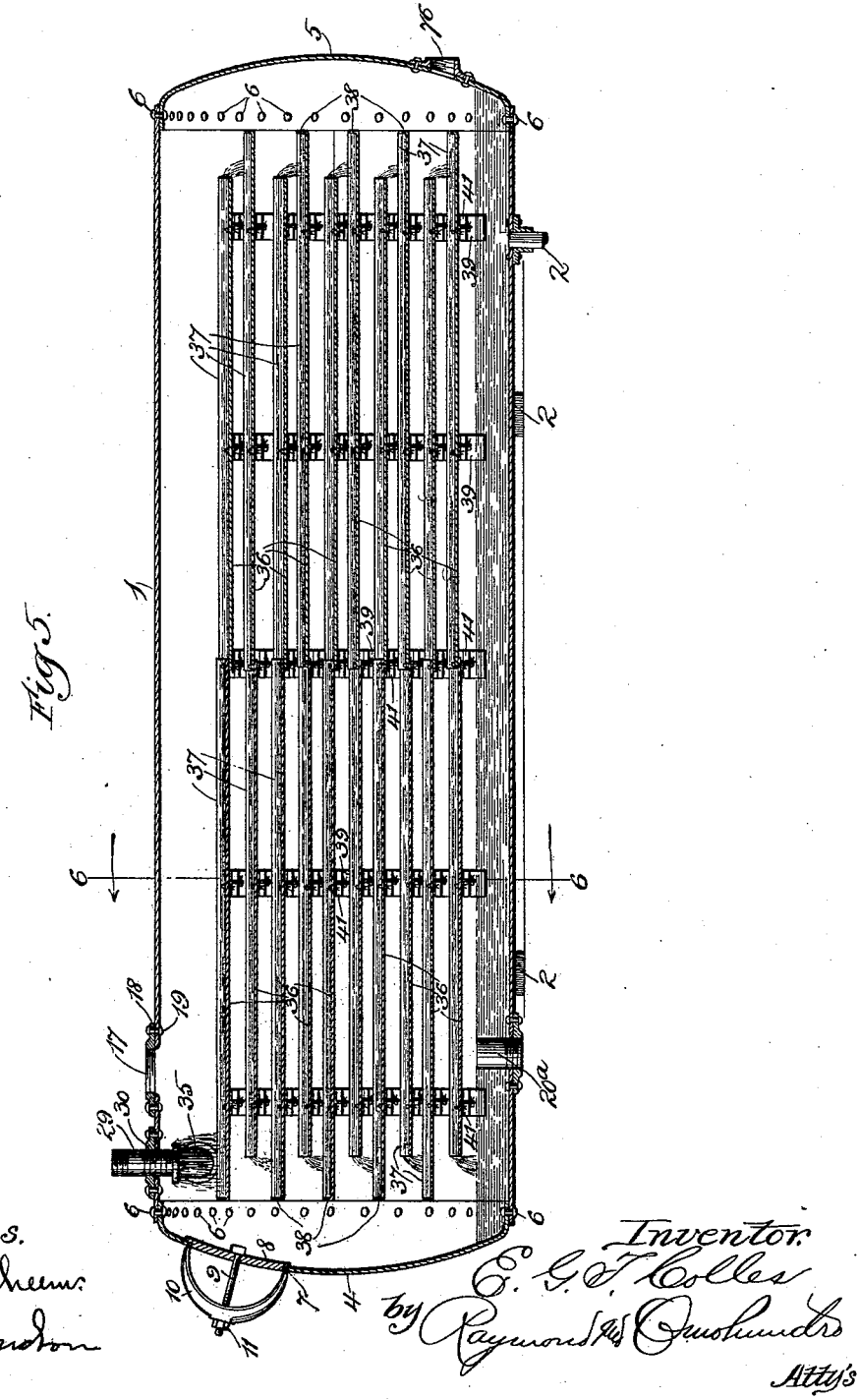

UNITED STATES PATENT OFFICE.

EDWARD G. T. COLLES, OF CHICAGO, ILLINOIS.

FEED-WATER HEATER AND PURIFIER.

SPECIFICATION forming part of Letters Patent No. 523,325, dated July 24, 1894.

Application filed November 14, 1893. Serial No. 490,892. (No model.)

*To all whom it may concern:*

Be it known that I, EDWARD G. T. COLLES, a citizen of the United States, residing at Chicago, in the county of Cook and State of Illinois, have invented certain new and useful Improvements in Feed-Water Heaters and Purifiers, of which the following is a full, clear, and exact description, reference being had to the accompanying drawings, forming a part of this specification.

My invention relates to apparatus for heating and purifying feed-water previous to its introduction into steam-boilers, and also for purifying the steam used for heating and purifying such feed-water.

The primary objects of my invention are, first to produce a feed-water heater which shall be simple and compact in its construction and rapid and efficient in its operation and in which the water shall be exposed throughout a very extensive area to the heating and purifying action of steam, by direct contact with such steam.

A still further primary object of my invention is to produce a feed-water heater and purifier in which the pans or trays over which the feed-water flows, while being heated and purified, shall be securely but removably supported in position and also be capable of ready removal from and replacement in the apparatus.

Still another primary object of my invention is to produce a steam-purifier adapted for use in connection with a great variety of such feed-water heaters as use steam for heating the feed-water, and which shall rapidly and effectively separate all oily and similar impurities from the steam previous to its introduction into the heater, and thus avoid all possibility of contamination of the feed-water by the steam used for heating the same.

The above-mentioned objects, together with such others as may appear from the ensuing description, are attained by the devices shown in the accompanying drawings, in which—

Figure 1 is a vertical longitudinal section of a feed-water heater and purifier embodying my invention. Fig. 2 is an enlarged elevation of the steam-inlet end of the feed-water heater and purifier. Fig. 3 is a transverse vertical section of the apparatus taken on the plane indicated by the line 3—3 of Fig. 1; the steam-pipe and float-valve connections to the pump being shown in position. Fig. 4 is a transverse vertical section of the apparatus taken on the plane indicated by the line 4—4 of Fig. 1; the direction of view being that indicated by the arrows applied to the section-line. Fig. 5 is a vertical longitudinal section of a modified form of feed-water heater embodying my invention. Fig. 6 is a transverse vertical section of the structure shown in Fig. 5; the plane of the section being that indicated by the line 6—6 of Fig. 5, and the direction of view being that indicated by the arrows applied to the section-line. Fig. 7 comprises detached sectional and elevation views of certain details of construction hereinafter described.

In the said drawings, 1 designates the shell or casing of the feed-water heater, this shell being of tubular form, placed horizontally and supported in such position by any suitable means. As shown, the shell 1 is desirably supported by suitable legs 2, of which there may be any desired number, and which rest upon a suitable setting or pier 3 of masonry-work. At its ends, the shell 1 is provided with two heads 4 and 5 which may be secured to the ends of the shell in any proper manner but which for the purpose of illustration are shown as having their outer margins turned inward so as to fit closely in the ends of the shell and as strongly riveted, as at Fig. 6, to said ends; the heads 4 and 5 being desirably concavo-convex as shown, and placed with their concave sides innermost.

At one end, the casing is provided with an inlet-opening 12 for exhaust-steam, from an engine or any other desirable source, this inlet-opening being either formed through the upper part of the head 5 as shown, or through the adjacent end-portion of the shell 1, and in any event, such inlet-opening is desirably surrounded by a thimble or coupling-ring 13 which protrudes outwardly from the opening so as to be conveniently connected to a pipe for conveying exhaust-steam into the heater. This thimble may also, if desired, be formed at its inner end with an external flange 14 through which extend rivets 15 for securing the thimble to the head or to the end of the shell. At the upper part of the opposite end of the casing is located an outlet-opening 16 for escaping steam, such opening being either formed through the end of the shell or through the head 4, as preferred, and in either event said opening may be desirably provided with a thimble 17 having an external flange 18 through which pass rivets 19 to secure the thimble to the shell or head, as the case may be.

At any suitable point at the lower part of the casing is connected an outlet-pipe 20 for the feed-water, this pipe being connected to a suitable feed-pump for forcing the heated feed-water into a boiler or boilers. This pipe may be connected to the lower part of the shell 1 near either head or at any point intermediate of said heads, or, if desired, to the lower part of either head. A blow-off pipe 21 is also connected to the lower side of the shell 1, at any point intermediate of the ends of said shell, said pipe being provided with a suitable valve 22, and serving when necessary, to discharge any slimy or other sediment from the shell. For purposes of strength, the pipes 20 and 21 may desirably be threaded respectively into socket-plates 23 and 24 which are riveted to the shell 1. A water-gage 25 is also desirable, for indicating the amount of feed-water in the shell, and such gage may be located at any proper point; it being shown as connected by upper and lower pipes 26 to the head 4 and also as provided with the usual valves 27 and vent 28.

Into the upper part of the shell 1 is inserted one end of a water-supply pipe 29, such pipe being inserted either through the upper part of that end of the shell which carries the head 4 or through the upper part of said head. For purposes of strength, the pipe 29 may desirably be threaded through a socket plate 30 which is securely riveted to the shell 1 or head 4, as the case may be. This supply-pipe 29 leads from any suitable source of water-supply, and is shown as provided with a hand-valve 31 for controlling the flow of water through the pipe. To that end of the supply-pipe 29 which protrudes within the shell 1 are connected a number of outlets either opening directly downward, as shown at 32 in Figs. 1 and 4, or upward, as shown at 33 in Figs. 5 and 6; such outlets being connected to said end of the supply pipe either by cross-coupling 34 or by a T-coupling 35, or in any suitable manner. The purpose of these outlets 32 or 33 is to discharge the water in open or spread form within the shell.

Within the shell 1 are placed numerous removable pans or trays 36, of peculiar individual construction, as hereinafter explained, and arranged nearly horizontally one above another, so as to extend longitudinally of the shell, as shown. The series of pans or trays also extend from near the lower side of the shell to near the upper side of the same, and are so disposed, as will also be hereinafter explained, that the water in flowing through the heater shall pass alternately in opposite directions from the receiving to the discharge ends of the trays. Thus the water is caused to pass over an extensive surface area, while the pans or trays are nevertheless very compactly arranged.

Each horizontal set of pans or trays 36 is shown as either composed of six trays, disposed in transverse series of three trays each, placed closely together side by side, as in Fig. 4, or of two trays each placed a slight distance from each other as in Fig. 6. Longitudinally, each set of trays is shown as equal in length to two trays and the inner end of that tray which is placed at the receiving end of the set rests upon the contiguous end of the companion tray, so that there shall be but little if any leakage as the water passes from one tray to another of the set. There may be more or less than two trays transversely in each set and more or less than two trays longitudinally in each set, and in any event each tray is provided at each side with an upwardly extending shallow flange 37. All of the trays of each set are open at both ends, excepting the trays at the receiving ends of the sets and these trays are provided at their receiving ends with transverse shallow flanges 38; the side flanges 37 preventing the water from falling over the sides of the trays and the end-flanges 38 preventing the water from falling over the receiving ends of the sets of trays. Moreover, the sets of trays are so disposed that the receiving end of one set protrudes longitudinally beyond the discharge end of the set above, so that the water shall fall naturally from the discharge end of the upper set of trays and upon the receiving end of the next lower set. The arrangement of these pans or trays is also such as to enable the steam to flow freely upward between the side edges of the trays and the shell, and thus completely envelop the trays, so as to insure a more effective heating-contact of the steam with the water. These trays 36 are supported in their described position by means of integral bracket-pieces 39 each of segmental form to accord with the curvature of the inner surface of the shell 1, said bracket pieces being riveted or bolted, as at 40, to the opposite sides of said shell. Each bracket-piece 39 is formed with a suitable number of inwardly extending bracket-arms 41, integral with the body-portion of the bracket-piece and projecting horizontally inward from the latter, and each of these bracket-pieces 41 is bifurcated vertically to receive one end of the flange or rib 43 of the corresponding pan 36. Each rib 43 extends transversely beneath as many of the pans or trays 36 as compose each set transversely, thus supporting said pans or trays in proper position, and if desired, suitable split pins or keys, similar to the pins or keys 44, presently to be described, may be inserted through the bottoms of the pans or trays and through the upper parts of the ribs 43 so as to detachably connect the pans or trays to said ribs.

In any event, there are to be as many of the bracket-pieces as shall be necessary to securely support the pans, and these bracket-pieces are to be placed in pairs at opposite sides of the shell 1, while there are to be at least as many bracket-arms 41 as there are vertical sets of pans. If desired also, for purposes of additional security, removable split keys 44 may be inserted transversely through the ends of the ribs 43 and similarly beneath the bracket-arm 41, so as to prevent all possible dislocation of the pans.

Immediately above the uppermost set of pans 36 is placed a deflecting or diffusing plate 45 which extends horizontally within the shell 1 and which is perforated or reticulated throughout nearly its entire length; that end of the diffusing or deflecting plate which is adjacent to the steam-inlet end of the heater being preferably bent downward, as shown at 46, for a purpose to be hereinafter explained. This deflecting or diffusing plate 45 is supported in its described position by means of brackets 47 riveted or otherwise strongly secured to the inner surface of the heater-shell, at opposite points, near the upper part of the shell; said brackets being of approximately L-form so as to support the sides of the plate upon their lower and inwardly extending arms, and the sides of the plate 45 being preferably riveted to the lower ends of the brackets 47, as shown.

Adjacent to that end which is near the head 4 of the shell 1, the diffusing-plate 45 carries a baffle-plate 48 which is desirably a channel-iron riveted or otherwise suitably secured to the diffusing-plate 45 and extending transversely of the diffusing-plate and shell, and also rising vertically from the diffusing-plate as shown; the flange at the upper margin of the baffle-plate extending away from the head 4, for a purpose to be hereinafter explained, and the perforated or reticulated portion of the diffusing-plate 45 terminating at the baffle-plate.

In Figs. 5 and 6, the diffusing-plate 45 and the baffle-plate 48 are not shown, inasmuch as such plates, although very desirable, may in certain instances be dispensed with, such for example as where live steam is employed. Where exhaust steam from high pressure engines, &c., is to be employed, however, the diffusing-plate and baffle-plate should be employed so as to prevent the exhaust steam from rushing directly from the steam-inlet to the steam-outlet of the heater. In any event, the pans 36 of the lowest set are preferably perforated, so as to allow the water to escape in numerous streams throughout the entire length of the lowest set of pans and upon the bottom or lower side of the heater.

With either of the above described structures, in order to permit of the convenient insertion and removal of the water pans, to be presently described, the head 4 is formed with a man-hole 7 preferably located at the upper part of the head, as shown, and provided with a cover 8 to close the manhole; this cover being shown, for example, as having a stem 9 protruding outwardly from it, and said stem passing through the middle of a spider 10, which impinges against the outer surface of the head, and the parts being held in proper connection by a retaining-nut 11 screwed upon the outer end of the stem.

49 designates a float, which may either be of the spherical form shown, or of any other suitable form, and which is attached to the free end of a rock arm 50 the opposite end of which is rigidly secured to the inner end of a rock-shaft 51. This rock-shaft 51 extends horizontally through the lower part of the head 4 of the heater-shell 1, and is surrounded at its point of passage through said head, by a stuffing-box 52 which prevents leakage at such point. At its outer end, the rock-shaft 51 carries a rigid rock-arm 53 to the free end of which is connected the lower end of a rod 54, the upper end of said rod being connected to the outer end of a rock-arm 55 at the outer end of the spindle 56 of a suitable valve placed behind the valve 31 for the water inlet pipe 29. The float 49 is buoyed up by the body of water in the bottom of the heater-shell and consequently rises, when the volume of such water increases, and falls when such volume decreases. When the float 49 rises above a certain point it acts, through the rock-arms 50, 53 and 55 and rod 54 to close the valve above referred to as being behind the valve, and when the float falls below a certain point it acts, through said connection, to open the valve 31; the amount of water in the lower part of the shell 1 being thus maintained approximately constant.

At the opposite end of the heater is placed a steam-pipe 57 leading to the boiler, and also a steam-pipe 59 leading to the steam chest of a suitable feed-pump (not shown); the pipes 57 and 59 being connected together by a bend or cross-pipe 58 having a suitable valve 60. Within the adjacent end of the shell 1 is located a float 61, either of spherical or other suitable form, and attached to the free end of a rock-arm 62 carried by the inner end of a rock-shaft 63. This rock-shaft 63 extends horizontally through the lower part of the head 5 of the heater-shell, and is surrounded at its point of passage through said head by a stuffing-box 54 which prevents leakage at this point. At its outer end, the rock-shaft 63 carries a rock-arm 65 to the free end of which is connected the lower end of a rod 66, the upper end of said rod being connected to the free end of a rock-arm 67 carried by the spindle 68 of the valve 60. The float 61 is buoyed by the body of water within the lower part of the shell 1 and rises and falls respectively as the volume of such water increases or diminishes. Acting through the rock-arms 62, 65 and 67, and the rod 66, the rising movement of the float 61 beyond a certain limit serves to open the valve 60 and thus to start the pump, while the falling movement of the float beyond a certain limit acts through the same connections to stop the pump; the water being thus maintained at a practically uniform level. I have also shown a by-pass pipe 69 as connecting the steam supply pipes 57 and 59; such by-pass being provided with a hand-valve 70 which is normally kept closed, but which is to be opened, when, for any reason, it is desired to operate the feed-pump independently of the float-controlled valve 60.

Within that end of the heater-shell 1 to which the head 5 is secured, is located a vertical partition 71 extending from near the lower part of the shell toward the upper part of said shell. The body-portion of this partition 71 is perforated or reticulated, as shown, and the lower part and sides of the partition extend toward the head 5. The edges of these forwardly extending parts of the partition 71 are riveted or otherwise strongly united to the head 5 and embrace an impact-plate or partition 72 which extends vertically between the head 5 and the partition 71. The upper end of this plate 72 extends toward the head 5 and is riveted to a casting 72ᵃ secured thereto above the steam-inlet opening 12 while the lower end of said plate 72 is also bent toward the head 5 and is riveted to the bent lower end of the partition 71. Obviously, the lower end of the plate 72 may be riveted to the head 5 while the lower end of the partition 71 is riveted to the lower end of the plate 72, but in any event, the lower part of the plate 72 is formed with an opening 73, for the inward passage of steam and from the outer surface of said plate protrude a plurality of ledges 74. These ledges 74 are each longitudinally of approximately V-shape, their angles being at the middle of the plate and the ledges being placed at regular intervals one above another. Obviously, the ledges 74 may be either formed integrally with the plate 72, or they may be in the form of angle-irons or separate pieces of any kind riveted or otherwise secured to the plate 72. An outlet or drip-pipe 75 extends through the head 5 and communicates with the interior of the compartment formed by the plate 72 and the head 5.

In the structure shown in Figs. 5 and 6 the partition 71 and plate 72 with its described attachments are omitted and this omission is permissible when the heater is used in places where no purification of the steam is necessary, such for example as where only live steam is used.

The operation of the above described apparatus is as follows: Water is admitted through the supply pipe 29 and flows back and forth over the pans 63 and downward within the heater, as above described, until it reaches the bottom or lower part thereof. Meantime exhaust steam is entering the heater through the inlet-opening 12 and such steam first strikes the plate 72 and, being unable to escape upwardly over this plate, is compelled to flow downwardly and then inwardly through the opening 73 in the plate. Any oily or other impurities which may be mingled with the steam are immediately dashed against the outer surface of the impact-plate and are intercepted by the ledges 74; such impurities flowing laterally upon the edges, and dropping from their outer ends, and collecting upon the outwardly extending lower part of the plate 72, from which the impurities are discharged through the drip-pipe 75. After having been thus purified, the steam flows inward through the opening 73 in the impact-plate 72, thence upward between the plates 71 and 72, and inward through the openings in said plate 71, and also inward over the top of said plate; the steam thus filling the interior of the shell 1, and enveloping the pans or trays 63, and a portion of the steam flowing between the diffusing-plate 45 and the upper part of the shell 1, and impinging against the baffle-plate 48. The contact of the steam with the water flowing back and forth over the pans or trays 36 and downward through the heater, heats such water to the proper degree for introduction into the boiler or boilers, and the steam finally escapes through the outlet 17. The heating of the water facilitates the precipitation of alkaline and other impurities which would be injurious to the boilers; such impurities being deposited in the lower part of the heater, and occasionally blown out of the same through the blow-off 21. Such of the impurities as settle upon the pans or trays are removed therefrom occasionally, as required, by removing such trays through the manhole, when the cover 8 is displaced for the purpose. The heated feed-water is drawn out of the heater through the outlet-pipe 20 and fed to the boilers, and the floats 49 and 61 respectively regulate the inflow and discharge of water, so as to maintain a practically uniform level within the heater.

With the structure shown in Figs. 5 and 6 (which is more particularly designed for heating by live steam) the steam may enter the opening 17 and escape through the opening 76 in the head 5, or it may enter the opening 76 and escape through the opening 17. In either event, the steam acts upon the successive streams of water flowing over the pans 36 and falling from one set of pans to another so as to heat the same, and the water is pumped out through the pipe 20 and fed to the boiler. No baffle-plate, diffusing-plate or purifier is here shown, since the working conditions in this instance would not usually require them, and it is to be understood that the floats 49 and 61 with their connections may either be dispensed with or employed, as desired. In either instance, the pans 36 can be readily removed from the heater, by first removing the manhole cover 8 and passing the pans successively out through the manhole 8. After the pans have been freed from sediment, they can be replaced in the heater, through the manhole 7, in an obvious manner.

It is to be understood that various modifications in minor details of construction may be adopted without involving any departure from the essential spirit of my invention. For example, the heads 4 and 5 may be of other than concavo-convex form, if desired and the flanges at the margins of said heads may be used, or the heads may be connected to the ends of the shell in any desired manner. The inlet-opening 12 may be located at one side of the end of the shell 1, if preferred, and the outlet-opening 16 may also be either in the head of the shell, or in one side of the end of said shell. Furthermore, if preferred, the rock-shafts 51 and 64 may extend through the end portions of the shell, and the partition 71 if used may extend upward to the top of the shell; the steam then all flowing through the perforations in the partition. Again, an upwardly extending flange $72^b$ may be formed at the front of the lower end of the plate 72, so as to form a box-like receptacle for the oil on its way to the drip-pipe 75.

When the apparatus above described is used in connection with steam heating systems and similar structures, the water of condensation from the radiators may enter the feed-water heater through an inlet-pipe $20^\times$ (see Fig. 1) let into the heater-shell at any desirable point but preferably at the lower part thereof.

Having thus described my invention, what I claim as new therein, and desire to secure by Letters Patent, is—

1. A feed-water heater, comprising a suitable shell or casing a plurality of bracket-pieces, secured within said shell or casing and provided each with a plurality of bifurcated bracket-arms, and a plurality of water pans or trays resting upon the bracket-arms and having supporting-ribs or flanges entering the bifurcations of the bracket-arms, substantially as set forth.

2. A feed-water heater, comprising a suitable shell or casing a plurality of integral segmental bracket-pieces secured to the inner surface of the shell, at opposite points thereof, and having each a plurality of bifurcated bracket-arms, and a plurality of water pans or trays supported upon the bracket-arms, and separate supporting ribs or flanges for said pans entering the bifurcations of the bracket-arms, substantially as set forth.

3. A feed-water heater, comprising a suitable shell or casing, and a plurality of water pans or trays located therein, and also provided with an exhaust steam purifier having an inlet-opening for steam connected to the top portion of the purifier, a steam-inlet passage in the lower part of the impact-plate, and a discharge-opening at the upper part of the purifier and communicating with the interior of the heater, and also containing a plurality of ledges for separating oil from the steam as the latter flows through the purifier, substantially as set forth.

4. A feed-water heater, comprising a suitable shell or casing, and a plurality of water pans or trays located therein, and also provided with an exhaust-steam purifier consisting of an impact-plate having a plurality of ribs or flanges for separating the oil from the steam, an outlet-opening formed through the lower part of said impact-plate and communicating with the interior of the heater, an inlet-opening placed at the top of the purifier, and an oil-drip pipe communicating with the lower part of the steam purifier, substantially as set forth.

5. A feed-water heater comprising a horizontal shell or casing, a plurality of vertical-bracket-pieces secured to the inner surface thereof and having vertically bifurcated bracket-arms, a plurality of horizontal water pans or trays located one above another within the shell, and a plurality of supporting ribs attached to the bottoms of said pans, said ribs fitting the bifurcations of the bracket-arms, substantially as set forth and described.

6. A feed-water heater and purifier, comprising a horizontal shell or casing containing a plurality of sectional water pans or trays arranged one above another, bracket-pieces secured to the inner surface of said shell and provided with bifurcated arms, angle bars or ribs attached to the bottom of said pans or trays adapted to fit into the said bifurcated arms and an impact-plate placed vertically at one end of the shell and provided at its outer surface with a plurality of ribs for separating the oil from the incoming exhaust steam, substantially as set forth and described.

7. A feed-water heater and purifier, comprising a horizontal shell or casing, a plurality of water pans or trays located therein one above another, an impact-plate placed vertically at one end of the shell and provided at its outer surface with a plurality of ribs for separating the oil from the incoming exhaust steam, a steam-inlet opening placed adjacent to the upper part of the impact-plate, and a steam-discharge opening formed through the lower part of the plate and communicating with the interior of the heater, substantially as set forth.

8. A feed-water heater and purifier, comprising a horizontal shell or casing containing a plurality of water pans or trays arranged one above another, a vertical impact-plate located at one end of said shell and provided with a plurality of segmental ribs extending one above another transversely of the outer surface of the plate, a steam-inlet located adjacent to the upper end of the plate, a discharge opening formed through the lower part of the plate and communicating with the interior of the heater, and an oil outlet placed adjacent to the lower end of the plate, substantially as set forth.

EDWARD G. T. COLLES.

Witnesses:
JNO. L. CONDRON,
O. R. BARNETT.